(12) United States Patent
Long, Jr. et al.

(10) Patent No.: US 9,714,859 B1
(45) Date of Patent: Jul. 25, 2017

(54) INVERTED OIL LEVEL SENSOR ASSEMBLY

(71) Applicant: United Technologies Corporation, Hartford, CT (US)

(72) Inventors: Wesley Paul Long, Jr., Vernon, CT (US); Eric J. Heims, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 76 days.

(21) Appl. No.: 15/002,463

(22) Filed: Jan. 21, 2016

(51) Int. Cl.
*G01F 23/04* (2006.01)

(52) U.S. Cl.
CPC ................... *G01F 23/04* (2013.01)

(58) Field of Classification Search
CPC ....................................... G01F 23/04
USPC ....................................... 73/290 R
See application file for complete search history.

(56) References Cited

U.S. PATENT DOCUMENTS

| | | | | |
|---|---|---|---|---|
| 3,442,017 A | * | 5/1969 | Frenkel | G01F 23/04 33/717 |
| 3,699,914 A | * | 10/1972 | Smith | G01F 23/161 116/227 |
| 7,931,004 B2 | * | 4/2011 | Koyama | F01M 11/12 123/192.2 |

FOREIGN PATENT DOCUMENTS

JP    2001336696 A  * 12/2001

* cited by examiner

*Primary Examiner* — Lisa Caputo
*Assistant Examiner* — Punam Roy
(74) *Attorney, Agent, or Firm* — Kinney & Lange, P.A.

(57) ABSTRACT

An oil level sensor assembly for an oil tank includes a cell with a first set of holes along the cell, an oil level sensor within the cell that is configured to be inserted into and removed from a bottom of the cell, and a ball valve column within the cell and adjacent to the oil level sensor. The ball valve column is rotatable, has ball valves that correspond with the first set of holes along the cell, and is configured such that the ball valve column is rotatable to an open position aligning the ball valves with the first set of holes to allow oil to access the oil level sensor and rotatable to a closed position misaligning the ball valves with the first set of holes to prevent oil from accessing the oil level sensor.

20 Claims, 10 Drawing Sheets

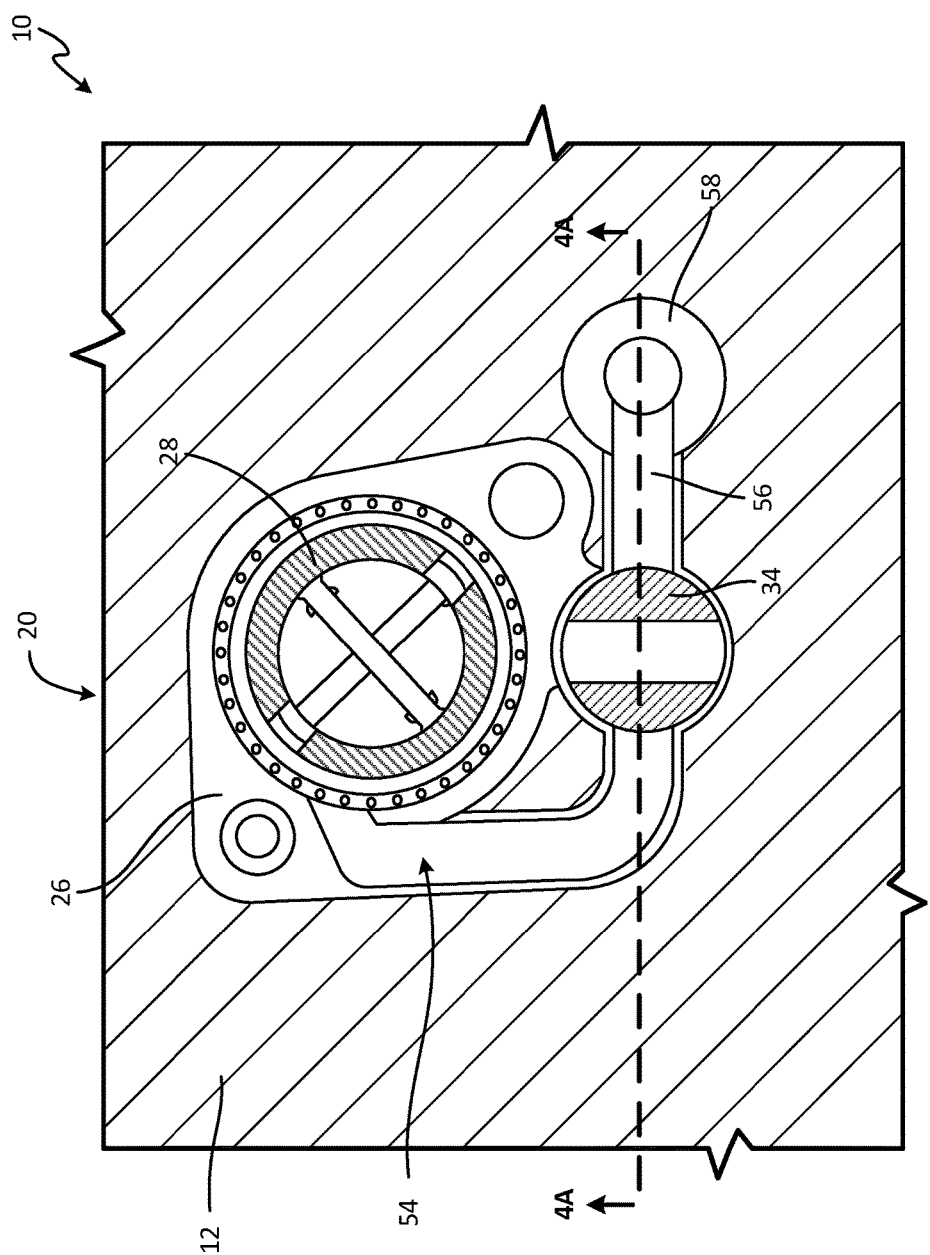

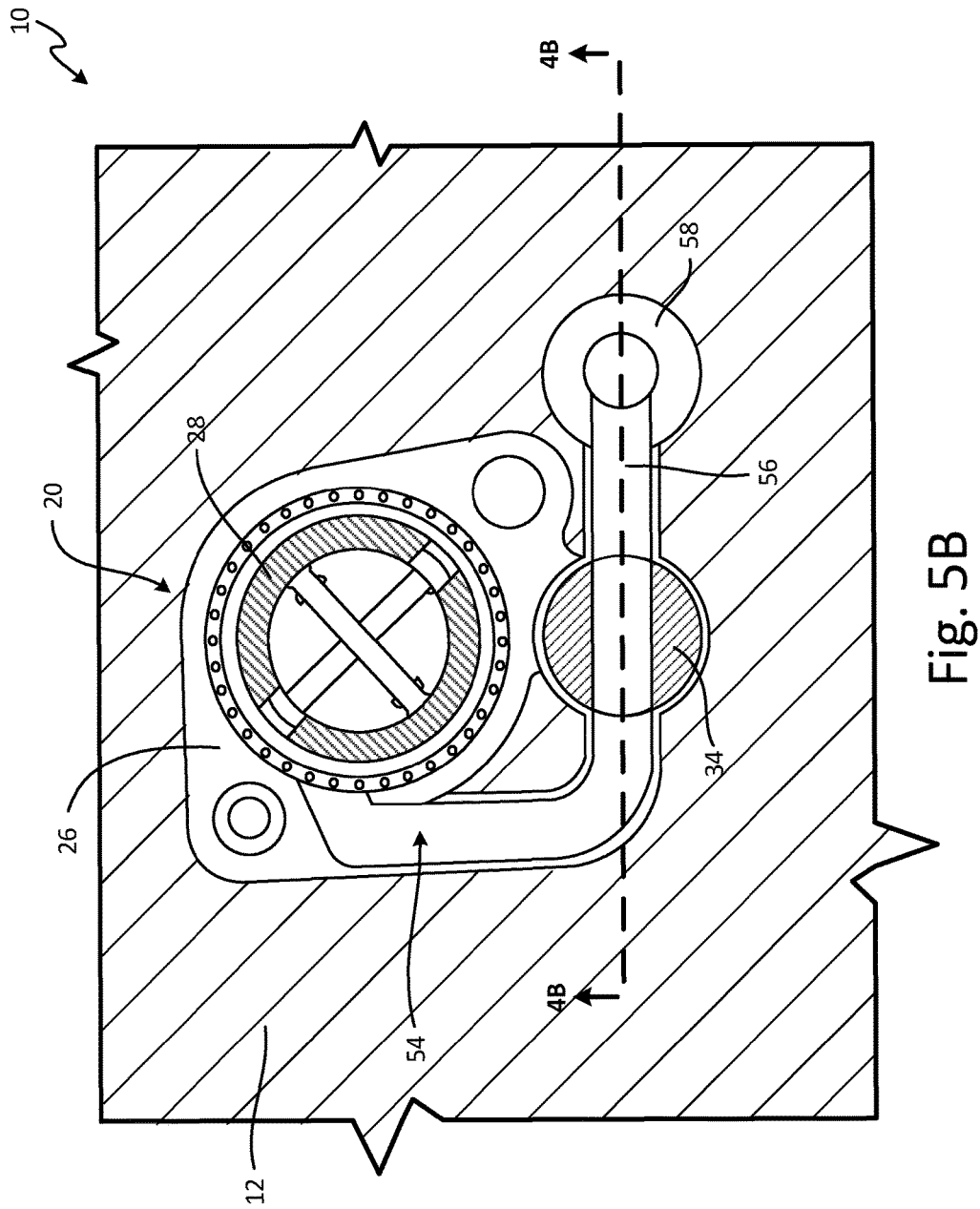

US 9,714,859 B1

INVERTED OIL LEVEL SENSOR ASSEMBLY

BACKGROUND

The present disclosure relates to lubrication systems for engines. More specifically, the present disclosure relates to oil level sensors for oil tanks in engines.

Most complex engines require lubricant, such as oil, to reduce friction to prevent overheating and damage to components. The oil is housed in one or multiple oil tanks with hoses running from the oil tank to components in need of lubrication and back to the oil tank. As engines become more complex, oil tanks become larger. Additionally, the increased complexity of engines results in an increased size. To minimize the increasing size of the engine, oil tanks are being fit into areas of the engine that are less accessible than oil tanks in previous engines.

To determine whether there is sufficient oil in the oil tank, an oil level sensor is used. Usually, the sensor is inserted from the top of the oil tank and accessible from the top by maintenance personnel, such as a dipstick utilized with an automotive engine. However, a top-loaded oil level sensor requires an air gap between the oil and the top of the oil tank, requiring the oil tank to be even larger. Sometimes it is more convenient for the oil level sensor to be inserted from the bottom of the oil tank and accessible from the bottom by maintenance personnel. While the oil level sensor can be inserted from the bottom of the oil tank, the removal of the sensor requires that the oil tank be drained before opening a port on the bottom to remove the oil level sensor.

SUMMARY

An oil level sensor assembly for an oil tank includes a cell with a first set of holes along the cell, an oil level sensor within the cell that is configured to be inserted into and removed from a bottom of the cell, and a ball valve column within the cell and adjacent to the oil level sensor. The ball valve column is rotatable, has ball valves that correspond with the first set of holes along the cell, and is configured such that the ball valve column is rotatable to an open position aligning the ball valves with the first set of holes to allow oil to access the oil level sensor and rotatable to a closed position misaligning the ball valves with the first set of holes to prevent oil from accessing the oil level sensor.

An oil tank for an engine includes a container, a tube extending from a bottom of the container that has a series of holes along the tube that open into the container and an inner cavity that is accessible through a bottom of the tube, an oil level sensor within the tube that is configured to be inserted into and removed from the tube through the bottom of the tube, and a ball valve column within the tube and adjacent to the oil level sensor. The ball valve column has a plurality of valve elements that correspond with the series of holes along the tube and is rotatable between an open position that allows oil to flow through at least one of the series of holes and at least one of the plurality of valve elements to access the oil level sensor and a closed position that prevents oil from flowing through the series of holes and the plurality of valve elements.

The present summary is provided only by way of example and not limitation. Other aspects of the present disclosure will be appreciated in view of the entirety of the disclosure, including the entire text, claims, and accompanying figures.

BRIEF DESCRIPTION OF THE DRAWINGS

FIG. 5A is a cross-sectional plan view of the inverted oil level sensor assembly in the open position.

FIG. 5B is a cross-sectional plan view of the inverted oil level sensor assembly in the closed position.

Figure 1A:
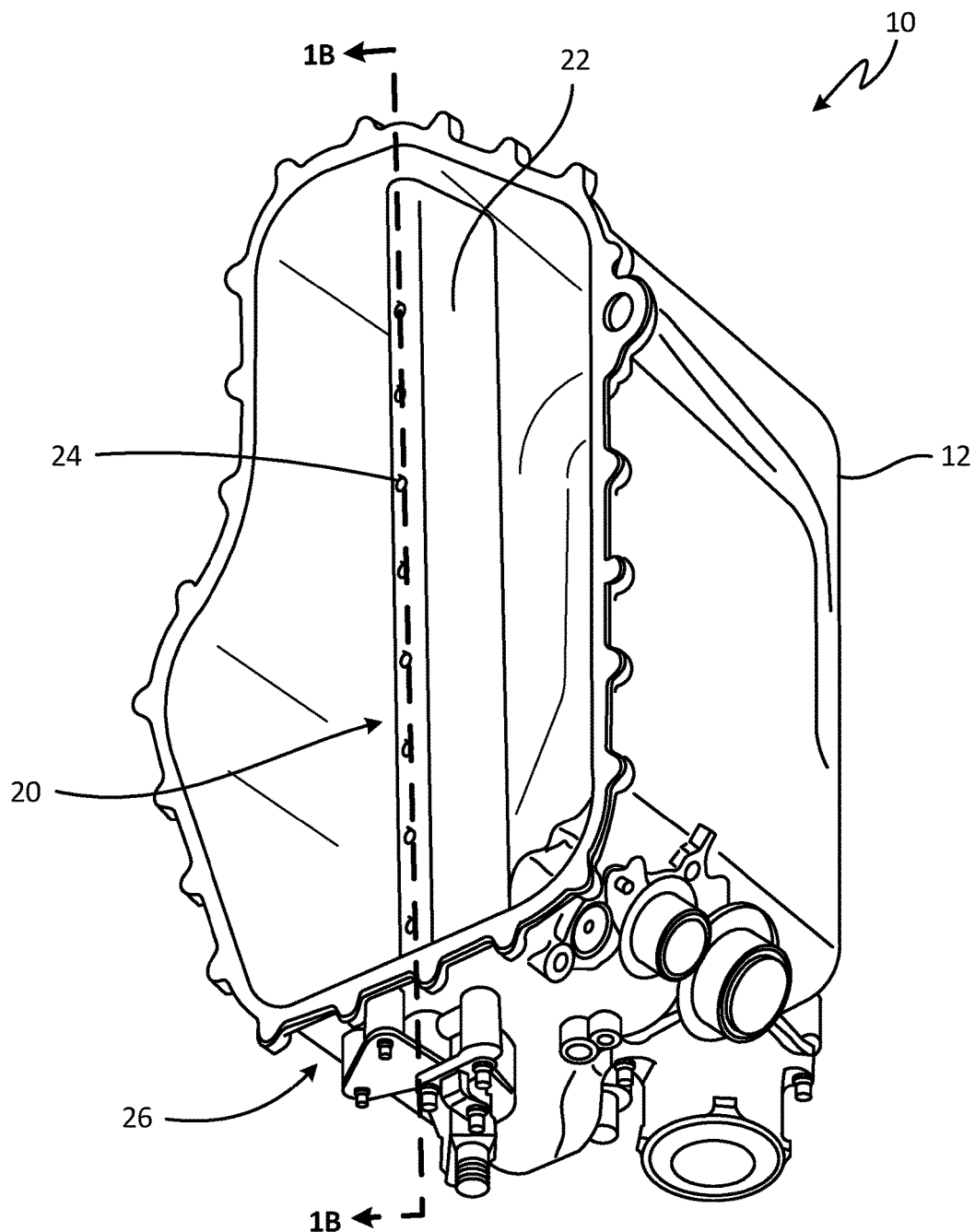
FIG. 1A is a cross-sectional perspective view of an oil tank with an inverted oil level sensor assembly.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

An inverted oil level sensor assembly for use in an oil tank is disclosed herein that includes a cell or tube within the oil tank that houses an oil level sensor and a ball valve column. The tube includes a series of holes that are configured to allow oil to enter the inside of the tube. The oil level sensor is configured to be inserted and removed from a bottom of the tube and the oil tank. The ball valve column has a plurality of ball valves that correspond with the series of holes in the tube. The ball valve column is rotatable between an open position and a closed position. When in the open position, the series of holes and the plurality of ball valves align to allow oil to flow into the tube so that the oil level sensor can measure the level of oil in the oil tank. When in the closed position, the series of holes and the plurality of ball valves are not aligned, preventing oil from flowing into the tube and allowing the oil level sensor to be removed without having to drain the entire oil tank.

At the bottom of the tube is a drain that allows oil to drain from an inner cavity of the tube before the oil level sensor is removed. The drain has a channel that is oriented perpendicular to (i.e., 90 degrees offset from) the series of holes in the tube and also incorporates a drain ball valve, which is part of the ball valve column and oriented similar to the plurality of ball valves such that when the ball valve column is in the closed position the drain ball valve aligns within the channel of the drain to allow oil to flow through the drain and out of the tube. Thus, oil cannot be drained from the tube through the drain unless the ball valve column is in the closed position so that the plurality of ball valves are not aligned with the series of holes, preventing additional oil to be drained from the oil tank other than the limited amount of oil within the tube.

The disclosed inverted oil level sensor assembly includes a number of other features. The drain can include a drain plug that engages an outlet of the drain to provide an additional safeguard against the draining of the tube and the oil tank. The ball valve column can include a handle extending from the bottom of the ball valve column to allow the rotation of the ball valve column between the open position and the closed position. The handle can be configured such that the drain plug secures the handle in the open position and must be removed before the handle can move to the closed position. The handle can also be configured to engage a base of the oil level sensor when the ball valve column is in the open position to prevent the removal of the oil level sensor when the ball valve column is in the open position. The oil level sensor assembly can also include a handle stop that prevents the handle and the ball valve from rotating past 90 degrees from the open position (i.e., rotating past the closed position) to ensure the drain ball valve is aligned within the channel of the drain.

The disclosed inverted oil level sensor assembly has many benefits. The assembly does not require the oil tank to be drained before the oil level sensor can be removed, saving maintenance time and oil that will be lost in the process. Because the oil level sensor is inserted from the bottom, a minimal air gap needs to be present at a top of the oil tank, reducing the size and weight of the oil tank. The assembly also has only a few moving parts (the rotation of the ball valve column between the open position and the closed position), reducing the complexity and the number of components that can become damaged throughout the life of the oil tank. The inverted oil level sensor assembly has a number of safeguards that prevent the oil level sensor from being removed without first sealing the tube off from the oil within the oil tank, preventing the oil tank from draining through the drain in the tube and the void left by the removal of the oil level sensor. Each of these benefits, along with others, will be appreciated in the subsequent disclosure.

Figure 1B:
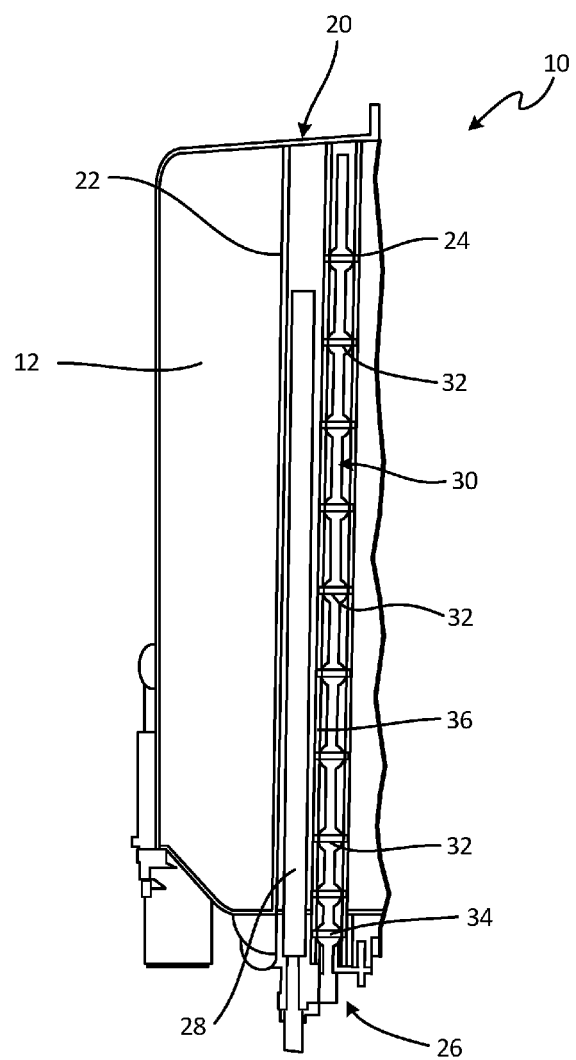
FIG. 1B is a cross-sectional elevation view of the inverted oil level sensor assembly of FIG. 1A.

FIG. 1A is a cross-sectional perspective view of an oil tank with an inverted oil level sensor assembly, and FIG. 1B is a cross-sectional elevation view of the inverted oil level sensor assembly of FIG. 1A taken along line 1B-1B. Oil tank 10 includes container 12 and oil level sensor assembly 20. Oil level sensor assembly 20 includes (among other components) tube 22 having a series of holes 24, bottom 26, oil level sensor 28, ball valve column 30 having a plurality of ball valves 32 and drain ball valve 34, and wall 36.

Oil tank 10 is configured to hold oil or another lubricant or may even be designed to hold fuel (for simplicity, the contents of oil tank 10 will be denoted as "oil" even though oil tank 10 can hold another fluid). Oil tank 10 is used in an engine in conjunction with other oil delivery mechanisms, such as oil hoses and a pump, to provide oil to the components of the engine to prevent the engine from overheating and becoming damaged. The functionality of oil tank 10 is known in the art and the configuration of oil tank 10 can be altered for design considerations of the engine in which oil tank 10 is located. As will be described below, oil tank 10 includes container 12 to hold oil and oil level sensor assembly 20 to measure the amount of oil within container 12.

Container 12 of oil tank 10 is an enclosure that holds a lubricant, such as oil, or another fluid. Container 12 will usually have an inlet and outlet that connects to oil hoses to allow oil to exit container 12 to provide cooling and lubrication to other engine components and thereafter reenter container 12 for storage. Container 12 an opening that allows for oil level sensor assembly 20 and may also include other openings as needed by the engine. Container 12 can have a variety of different sizes, shapes, and configurations depending on the engine in which oil tank 10 is located. Because oil level sensor assembly 20 is inserted from a bottom of container 12, a minimal air gap needs to be present in container 12 between a top of the oil (within container 12) and a top of container 12, reducing the size and weight of container 12. Container 12 can be one continuous and monolithic component or can be a number of components fastened together to create the enclosure, and container 12 can be constructed from a variety of materials, including metal or a composite material.

Oil level sensor assembly 20 of oil tank 10 measures the amount of oil within container 12 and convey that measurement to the necessary entity, such as a computer monitoring the engine, a digital display that is monitored by an operator, an oil level alarm, or some other visual or audio alert system. Oil level sensor assembly 20 can have a number of other components and configurations not specifically disclosed herein, but the overall functionality of oil level sensor assembly 20 should remain unchanged: to allow oil level sensor 28 to be inserted and removed from a bottom of oil level sensor assembly 20 without the need to drain the oil from container 12.

Tube 22 (also referred to as a cell) of oil level sensor assembly 20 creates an inner cavity that encloses the inner components of oil level sensor assembly 20 and separates those components from the rest of container 12. Tube 22 is an elongated vessel that is in contact with and runs from bottom 26 of oil level sensor assembly 20 (and the bottom of container 12) to the top of container 12. However, in other embodiments, tube 22 can terminate before the top of container 12 and have a cap to enclose tube 22 such that a top of tube 22 is not in contact with container 12. While tube 22 in FIG. 1A is shown as having a consistent substantially triangular or quasi-pear-shaped cross-sectional area along the entire length of tube 22, tube 22 can have a number of cross-sectional shapes; including circular (so that tube 22 is a cylinder), triangular, elliptical, rectangular, or another shape; and can have a varying cross-sectional shape along the entire length of tube 22. Tube 22 can be constructed from a variety of materials, including metal or a composite material, and can be constructed from the same material as container 12. Additionally, tube 22 can be molded and cast with container 12 or fastened to container 12 using welds, screws, or other fasteners. However, the connection between tube 22 and container 12 should be sealed so that oil cannot leak into tube 22 at a seam.

Tube 22 includes the series of holes 24 (also referred to as a first series of holes or a set of holes). The series of holes 24 are orifices along the length of tube 22 that allow oil to enter the inner cavity of tube 22 from container 12. The series of holes 24 are in a line at different positions along the length of tube 22 to allow oil to enter the inner cavity of tube 22 so that the level of oil within container 12 is equal to the level of oil in the inner cavity of tube 22. Each hole of the series of holes 24 should be sized to allow oil to easily move into and out of tube 22 without experiencing a problematic amount of drag so that the level of oil measured by oil level sensor 28 accurately represents the level of oil within container 12. While the disclosed embodiment shows the series of holes 24 with holes in a line, the series of holes 24 can be configured such that the holes having openings into different sides of tube 22. However, the series of holes 24 cannot be at a location along tube 22 that cannot correspond to ball valve column 30. Each hole of the series of holes 24 can have a variety of cross-sectional shapes and different holes can have different cross-sectional shapes. The series of holes 24 can include any number of holes, from a configuration that includes only two holes (one near the top and one near bottom 26) to a configuration that includes a dozen or more holes.

Bottom 26 of oil level sensor assembly 20 is adjacent to container 12 and is where tube 22 connects to container 12. Oil level sensor 28 is inserted into and removed from tube 22 through bottom 26. Adjacent to bottom 26 are a number of other components of oil level sensor assembly 20.

Oil level sensor 28 is housed within tube 22 and measures the amount of oil within container 12 by measuring the amount of oil in the inner cavity of tube 22. Oil level sensor 28 includes a sensor that extends into tube 22 and a base that attaches to bottom 26 of oil level sensor assembly 20. Oil level sensor 28 can extend the entire length of tube 22 or extend only partially into tube 22. Oil level sensor 28 can be a transducer, electronic sensor, or another sensor configured to measure the amount of a fluid and convey that measurement to the necessary entity. Because oil level sensor 28 is inserted and removed through bottom 26, oil level sensor 28 should be configured to function upside-down (as opposed to an oil level sensor that is inserted and removed through the top of container 12). The base of oil level sensor 28 attaches oil level sensor 28 to bottom 26 oil level sensor assembly 20 (through screws or other removable fasteners) and seals oil level sensor 28 within tube 22 to prevent oil from leaking out. Additionally, the base can also include an attachment for electronics or other components that accept the measurement from oil level sensor 28 and convey it to the necessary entity.

Ball valve column 30 is also housed within tube 22 adjacent to oil level sensor 28 and the series of holes 24 and rotates to seal the inner cavity of tube 22 from the oil within container 12. Ball valve column 30 extends into tube 22 and sticks out through bottom 26 to have a rotatable handle. Ball valve column 30 is shown as a substantially cylindrical shaped adjacent to oil level sensor 28, but can have another shape or configuration to seal the inner cavity of tube 22 from container 12, such as a hollow shape similar to the shape of tube 22 to be adjacent to all walls of tube 22 so that oil level sensor 28 is within ball valve column 30 and ball valve column 30 rotates around oil level sensor 28 to seal oil level sensor 28 from container 12. While denoted as "ball valve column" in this disclosure, the valve column can include any type of valve that is configured to rotate between one position that allows the flow of oil and another position that prevents the flow of oil from container 12 into tube 22. Ball valve column 30 can extend the entire length of tube 22 or extend only partially into tube 22. Ball valve column 30 can be constructed from a variety of materials; such as metal, plastic, or a composite material; but should have sufficient strength and rigidity to rotate within tube 22 without deforming (so as to remain aligned with the series of holes 24. Ball valve column 30 is housed within tube 22 but is not fastened to tube 22 so as to be able to rotate between an open position (as is shown in FIG. 1B) and a closed position.

Ball valve column 30 includes a plurality of ball valves 32 (also referred to as a plurality of valve elements) that correspond to the series of holes 24 to, when in the open position, allow oil to enter the inner cavity of tube 22 and, when in the closed position, prevent oil from entering the inner cavity of tube 22 (i.e., seal oil level sensor 28 from container 12). The plurality of ball valves 32 are along the length of ball valve column 30 and align with the series of holes 24. While denoted as "ball valves" in this disclosure, the valve elements can be any type of valve that is configured to at one position allow the flow of oil and at another position prevent the flow of oil from container 12 into tube 22. Each ball valve of the plurality of ball valves 32 can have the same orientation (i.e., all ball valves extend through ball valve column 30 in the same direction) as is shown in FIG. 1B or, if the series of holes 24 are not in a line along tube 22, can be oriented such that each ball valve is aligned with a corresponding hole when ball valve column 30 is in the open position. The number of ball valves of the plurality of ball valves 32 should be equal to the number of holes in the series of holes 24 and should be sufficient to allow oil to easily enter and exit the inner cavity of tube 22 so that the level of oil within tube 22 is equal to the level of oil within container 12. Additionally, each ball valve of the plurality of ball valves 32 should be sized to allow oil to easily move into and out of tube 22 without experiencing a problematic amount of drag so that the level of oil measured by oil level sensor 28 accurately represents the level of oil within container 12. The plurality of ball valves 32 of ball valve column 30 can be one continuous and monolithic component or each ball valve of the plurality of ball valves 32 can be separate components fastened to one another.

Drain ball valve 34 is a valve located at a bottom of ball valve column 30 and can be configured to rotate in conjunction with ball valve column 30. While denoted as "drain ball valve" in this disclosure, the drain valve can by any type of valve that is configured to at one position allow oil to flow and at another position prevent the flow of oil from tube 22 out of the system. Drain ball valve 34 is similar to the plurality of ball valves 32 but does not have a corresponding hole of the series of holes 24. Instead, drain ball valve 34 is within a drain passage that, when ball valve column 30 is in the closed position, drains oil out of the inner cavity within tube 22. Because the drain passage includes a channel in which drain ball valve 34 is located that is oriented perpendicular (90 degrees offset) from the plurality of ball valves 32, drain ball valve 34 in the disclosed embodiment has the same orientation as the plurality of ball valves 32 (i.e., drain ball valve 34 and the plurality of ball valves 32 extend through ball valve column 30 in the same direction). Drain ball valve 34 is not in fluidic contact with the oil in container 12 as the plurality of ball vales 32 are, but rather is in fluidic contact with the oil in tube 22 when ball valve column 30 is rotated to the closed position. Drain ball valve 34 can be one continuous and monolithic component with one or all of the plurality of ball valves 32 or can be separate from the plurality of ball valves 32 so as to be fastened to and move in conjunction with the plurality of ball valves 32 or not fastened to and move separately from the plurality of ball valves 32. The functionality of drain ball valve 34 will be described in greater detail with regards to FIGS. 4A, 4B, 5A, and 5B.

Wall 36 is within tube 22 and fluidically separates oil level sensor 28 from ball valve column 30. Wall 36 separates the inner cavity of tube 22 into two cavities (a first cavity and a second cavity) with the first cavity housing oil level sensor 38 and the second cavity housing ball valve column 30. Wall 36 includes a second series of holes (also referred to as a second set of holes) that correspond with the series of holes 24 and the plurality of ball valves 32 so that when ball valve column 30 is in the open position the second series of holes, the series of holes 24, and the plurality of ball valves 32 align to allow oil to enter the first cavity without filling the second cavity of tube 22. Wall 36 can reduce the amount of oil within tube 22 so that less oil is lost when the oil is drained from tube 22 through the drain passage and drain ball valve 34.

As will be described with greater detail with regards to FIGS. 2A, 2B, 3A, and 3B, ball valve column 30 is rotatable within tube 22 between the open position and the closed position. In the open position, ball valve column 30 aligns the plurality of ball valves 32 with the series of holes 24 and the second series of holes in wall 36 to allow oil to enter tube 22 so that oil level sensor 28 can measure the level of oil within tube 22 (which is the same level as the level of oil within container 12). In the closed position, ball valve column 30 is positioned so that the plurality of ball valves 32 do not align with the series of holes 24 and the second series of holes in wall 36 to seal the inner cavity of tube 22 from container 12 to prevent oil from entering tube 22. The position of ball valve column 30 when in the closed position aligns drain ball valve 34 within the drain passage to allow the oil within tube 22 to drain. With the oil in tube 22 drained, maintenance personnel can easily remove or insert oil level sensor 28 without the oil within the inner cavity of tube 22 causing problems.

Figure 2A:
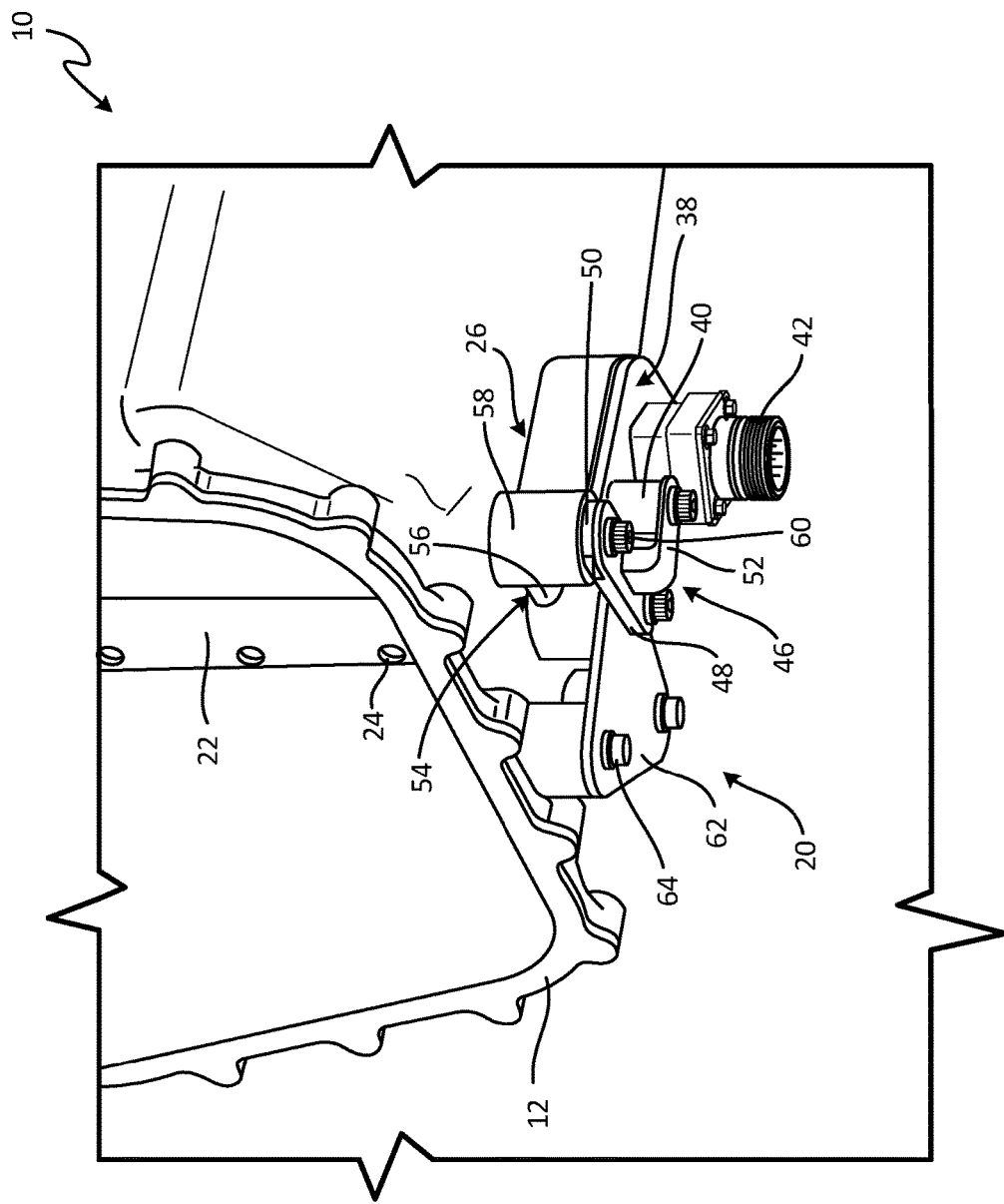
FIG. 2A is a perspective view of a portion of the inverted oil level sensor assembly in an open position.
Figure 2B:
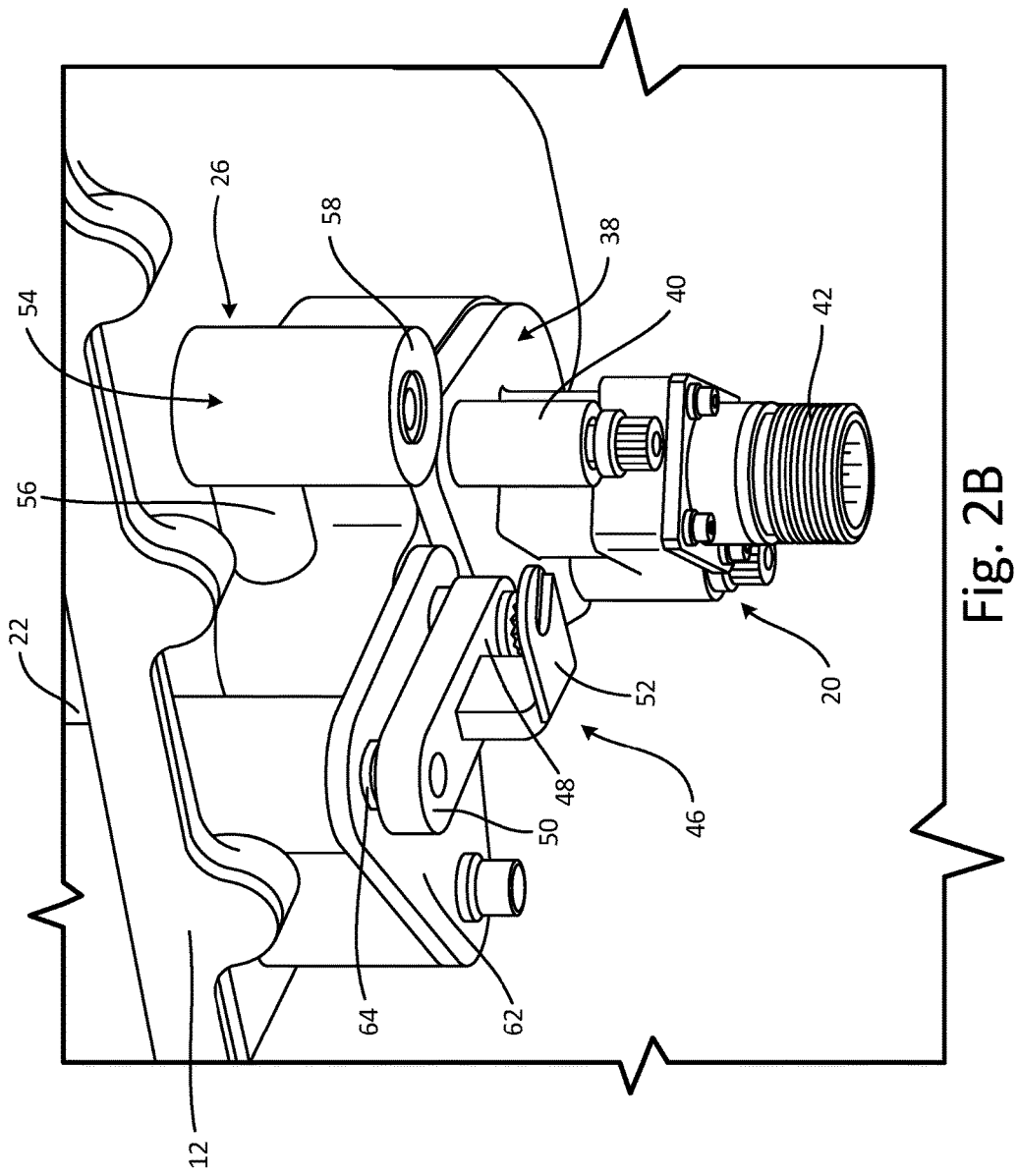
FIG. 2B is a perspective view of a portion of the inverted oil level sensor assembly in a closed position.
Figure 3A:
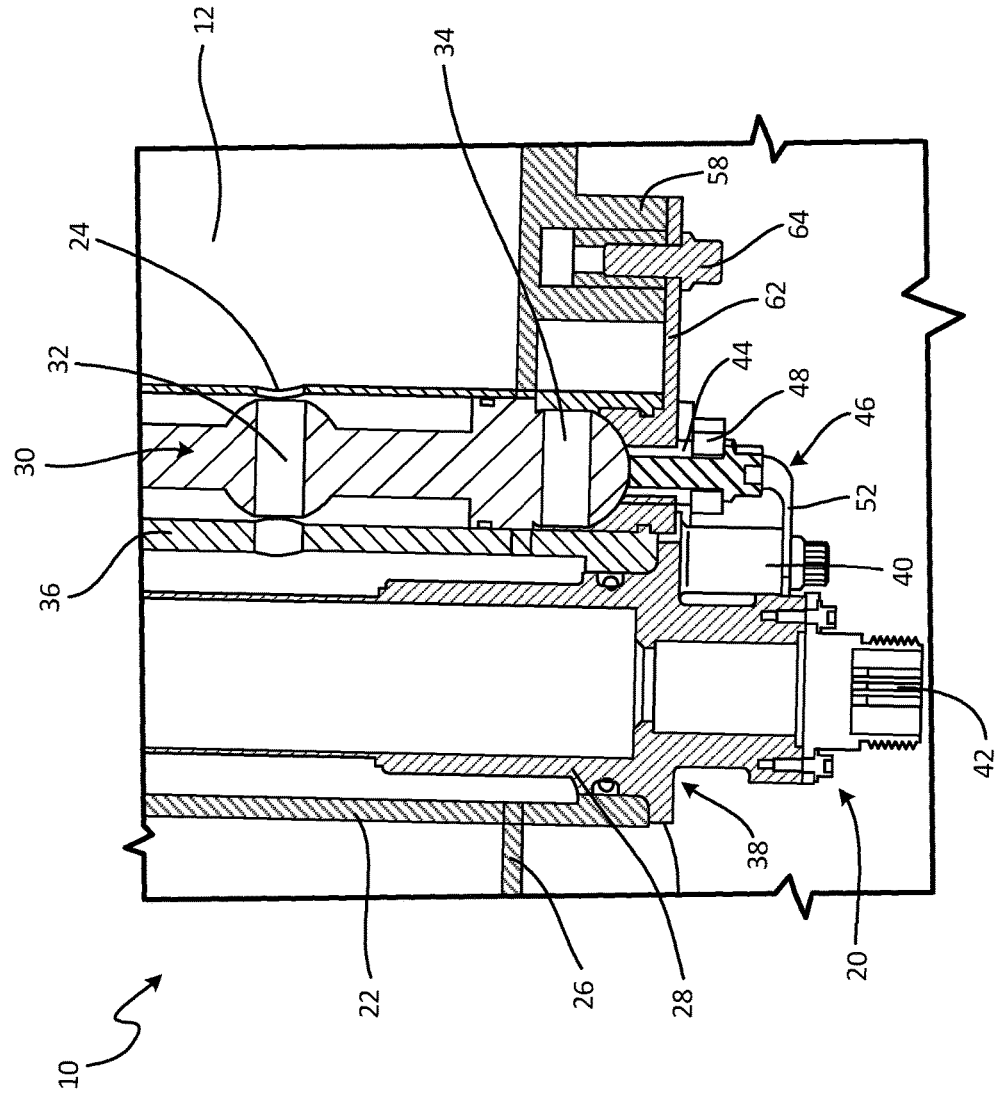
FIG. 3A is a first cross-sectional elevation view of a portion of the inverted oil level sensor assembly in the open position.
Figure 3B:
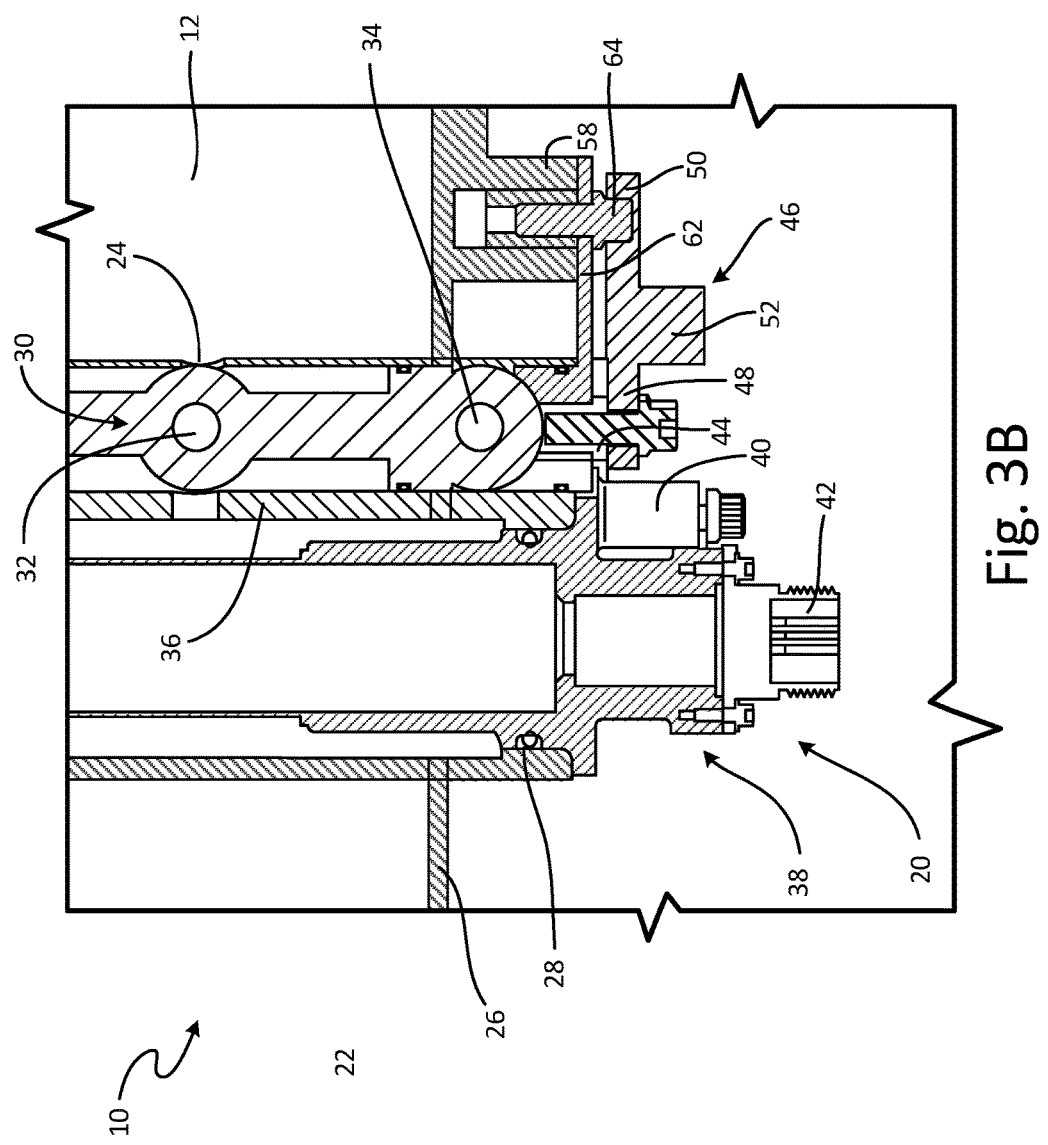
FIG. 3B is the first cross-sectional elevation view of a portion of the inverted oil level sensor assembly in the closed position.

FIG. 2A is a perspective view of a portion of the oil level sensor assembly in the open position, FIG. 2B is a perspective view of the portion of the oil level sensor assembly in the closed position, FIG. 3A is a first cross-sectional elevation view of a portion of the inverted oil level sensor assembly in the open position, and FIG. 3B is the first cross-sectional elevation view of a portion of the inverted oil level sensor assembly in the closed position.

Oil tank 10 includes container 12 and oil level sensor 20. Oil level sensor assembly 20 includes tube 22, the series of holes 24, bottom 26, oil level sensor 28, ball valve column 30, the plurality of ball valves 32, drain ball valve 34, and wall 36. Oil level sensor 28 includes base 38 with base 38 having base projection 40 and base connector 42. Ball valve column 30 includes ball valve column cap 44 and handle 46 with handle 46 having pivot wing 48, rotation wing 50, and arm 52. Oil level sensor assembly 20 also includes drain 54 with channel 56, drain outlet 58, and drain plug 60. Oil level sensor assembly 20 includes ball valve mount 62 having handle stop 64.

Base 38 of oil level sensor 28 is on a bottom of oil level sensor 28, protrudes downward through bottom 26, and may be visible on a bottom side of container 12. Base 38 can be one continuous and monolithic component with a portion of oil level sensor 28 that extends into tube 22 or base can be a separate component that is fastened to other portions of oil level sensor 28. Base 38 provides a structural area that allows oil level sensor 28 to be fastened to bottom 26 and provides a component that maintenance or other personnel can grasp to insert and remove oil level sensor 28 from tube 22. Base 38 also seals (possibly through the use of an O-ring or another sealing element) the inner cavity of tube 22 so that oil cannot leak out of the inner cavity of tube 22 through a hole in bottom 26 through which oil level sensor 28 extends. Base 38 of oil level sensor 28 can be attached to bottom 26 through various means, but should allow for oil level sensor 28 to be inserted and removed from tube 22 for maintenance. Base 38 can have any shape, configuration, or orientation and can be constructed from a variety of materials, including the same material used for the rest of oil level sensor 28.

Base projection 40 projects downward from a flat portion of base 38 to interact with arm 52 of handle 46 of ball valve column 30 when ball valve column 30 is in the open position (as shown in FIG. 2A and as will be discussed in greater detail below). Base projection 40 is a shaft that can have interior threads to accept a bolt that can tighten around a slot in arm 52 to secure arm 52 and ball valve column 30 in the open position. Base projection 40 can be one continuous and monolithic component with base 38 or a separate component that is fastened to base 38. Additionally, base projection 40 can have another size, shape, configuration, or orientation to interact with arm 52 or may not be present in other embodiments.

Base connector 42 projects downward from the rest of base 38 and provides an attachment for electronics or other components to connect to oil level sensor 28 to convey the measurement of the level of the oil within tube 22 from oil level sensor 28 and to the necessary entity. Base connector 42 can have a cylindrical shape that is externally threaded or another configuration to connect to electronics, electrical wires, or other ports. Base connector 42 can be one continuous and monolithic component with the rest or oil level sensor 28 or can be a separate component that is fastened to base 38. Further, base connector 42 can have any size, shape, configuration, or orientation to allow base connector 42 to convey the measurement of the oil level in tube 22 as measured by oil level sensor 22 to the necessary entity.

Ball valve column cap 44 is near a bottom of ball valve column 30 (adjacent to drain ball valve 34) and supports ball valve column 30 so that ball valve column 30 does not move vertically within tube 22 (to ensure plurality of ball valves 32 remain vertically aligned with the series of holes 24). Ball valve column cap 44 can also seal the inner cavity of tube 22 so that oil cannot leak out of the inner cavity of tube 22 through a hole in bottom 26 through which ball valve column 30 extends. Ball valve column cap 44 can be constructed from a variety of materials and can be one continuous and monolithic component with ball valve column 30 or can be a separate component. Additionally, ball valve column cap 44 can be incorporated into ball valve mount 62 and/or a fastener adjacent to pivot wing 48 of handle 46 (to form one component with ball valve mount 62 and be connected to the fastener). Ball valve column cap 44 can include an O-ring or another sealing element to sufficiently seal ball valve column 30 within tube 22. Ball valve column cap 44 can be configured to rotate with ball valve column 30 or remain stationary.

Handle 46 is connected to and on the bottom of ball valve column 30 and provides a handle for maintenance and other personnel to rotate ball valve column 30 between the open position and the closed position. Handle 46 can be one continuous and monolithic component with ball valve column 30 or can be a separate component attached to drain ball valve 34 and ball valve column cap 44 of ball valve column 30. Handle 46 extends downward from bottom 26 and can be visible on the bottom side of container 12. Handle 46 can be constructed from a variety of materials, but should have sufficient strength and rigidity to withstand the stresses placed on handle 46 from being used to rotate ball valve column 30. While handle 46 can have a variety of shapes, sizes, configurations, and orientations to provide a handle to rotate ball valve column 30, handle 46 of the disclosed embodiment includes pivot wing 48, which is directly downward from ball valve column 30 and is adjacent to ball valve column cap 44; rotation wing 50, which extends radially outward from a point where pivot wing 48 and ball valve column cap 44 interact; and arm 52, which extends downward and outward from a point between pivot wing 48 and rotation wing 50 to interact with base projection 40.

Pivot wing 48 is connected to ball valve column 30 (through drain ball valve 34) and may have a hole through pivot wing 48 to allow a fastener to connect pivot wing 48 to ball valve column 30 and/or to keep ball valve column 30, ball valve column cap 44, handle 46, and other components within oil level sensor assembly 20. Handle 46 and ball valve column 30 rotate about a point of pivot wing 48 that is along a line of rotation of ball valve column 30.

Radially outward from pivot wing 48 is rotation wing 50, which rotates 90 degrees between the open position (FIGS. 2A and 3A) and the closed position (FIGS. 2B and 3B). Rotation wing 50 can have a similar shape and size to pivot wing 48, including a hole near a tip of rotation wing 50. When in the open position, drain plug 60 can extend through the hole in rotation wing 50 into drain outlet 58 to secure handle 46 in the open position. When in the closed position, a notch in rotation wing 50 (as seen in FIG. 2A) can engage handle stop 64 to prevent handle 46 and ball valve column 30 from rotating past the closed position to ensure drain ball valve 34 aligns with channel 56 in drain 54.

Arm 52 extends downward from a point between pivot wing 48 and rotation wing 50 and outward to engage base projection 40 when handle 46 and ball valve column 30 are in the open position. Arm 52 has a slot that engages base projection 40 or a fastener on or within base projection 40. In the open position, the fastener of base projection 40 can be tightened to secure arm 52 in place to prevent ball valve column 30 and handle 46 from being rotated to the closed position by mistake, vibration, or another unintended means. Additionally, whether the fastener is tightened or not, the interaction between arm 52 and base projection 40 prevents oil level sensor 28 from being removed from tube 22 when in the open position because arm 52 would be downward from base projection 40 of oil level sensor 28 and oil level sensor 28 cannot be pulled downward and out of tube 22. Other embodiments may not contain a fastener on base projection 40 and a slot in arm 52 such that arm 52 simply rotates to be downward from base projection 40 without interacting with a fastener or any other part of base projection 40, or other embodiments of oil level sensor assembly 20 may not include handle 46 with arm 52 or base 38 with base projection 40.

Drain 54 (also referred to as a drain port) is a passage that runs from tube 22 through bottom 26 out of the system to allow a path for oil to drain out of tube 22 when ball valve column 30 is in the closed position. Drain 54 can run from a point adjacent to base 38 on the bottom side of container 12 to downward extending drain outlet 58, or can have another configuration or orientation to allow oil to drain from the inner cavity of tube 22. Drain 54 includes channel 56, which is a portion of drain 54 that runs in a direction that is perpendicular (90 degrees offset) to the series of holes 24 so that when ball valve column 30 (the plurality of ball valves 34 and drain ball valve 34) is in the open position drain ball valve 34 does not align with channel 56 and prevents oil from flowing through channel 56 (while otherwise allowing oil to flow into tube 22 through the series of holes 24 and the plurality of ball valves 32), but when ball valve column 30 is in the closed position drain ball valve 34 aligns with channel 56 to allow oil to flow through channel 56 and out of the system (while otherwise preventing oil from flowing into tube 22 through the series of holes 24 and the plurality of ball valves 32). Only a portion of drain 54 is shown in FIGS. 2A and 2B, but drain 54 and related components will be described in greater detail with regards to FIGS. 4A, 4B, 5A, and 5B.

Drain outlet 58 is a downward extending component of drain 54 and is where oil flows out of oil level sensor assembly 20. Drain outlet 58 is internally threaded to allow drain plug 60 to be inserted and fastened to drain 54 to prevent oil from flowing out of tube 22 through drain 54. Drain outlet 58 can have other sizes, shapes, configurations, and orientations, including drain outlet 58 being at a different location, not extending downward but rather extending parallel to bottom 26 or angled in another direction, or having external threads or other means to allow drain plug 60 to fasten to drain 54. Additionally, other embodiments may not include drain plug 60 and may rely only on drain ball valve 34 to prevent oil from draining out of tube 22 when ball valve column 30 is in the open position.

Drain plug 60 can be inserted into drain outlet 58 to prevent oil from flowing out of tube 22 through drain 54. Drain plug 60 can be a bolt, another fastener, or another apparatus that is able to be inserted into drain outlet 58 or otherwise configured to block the flow of oil. As shown in FIG. 2A, drain plug 60 can be inserted through the hole in rotation wing 50 into drain outlet 58 to prevent rotation wing 50, handle 46, and ball valve column 30 from rotating out of the open position. Drain plug 60 being inserted through rotation wing 50 provides a mistake-proof design in which oil cannot be drained from tube 22 until drain plug 60 is removed and ball valve column 30 (with handle 46) is rotated to the closed position. This provides a second level of protection (in addition to drain valve ball 34 rotating within channel 56) to prevent oil from draining out of tube 22 (and out of container 12) when ball valve column 30 is in the open position. Other embodiments may include a configuration in which drain plug 60 and rotation wing 50 do not interact, or interact some other way.

Ball valve mount 62 is downward from bottom 26 and is positioned in part between ball valve column 30 and handle 46. Ball valve mount 62 provides structural support to ball valve column 30 and handle 46, and handle 46 rotates/pivots about an end of ball valve mount 62. Ball valve mount 62 is relatively flat and forms a plane that is parallel to a plane formed by bottom 26. Ball valve mount 62 is shown in the disclosed embodiment as having a triangular shape, but other embodiments can include ball valve mount 62 having a variety of shapes, sizes, configurations, and orientations. Ball valve mount 62 can be constructed from a variety of materials, including metal or a composite material, and should have sufficient strength and rigidity to support ball valve column 30 and the other components of oil level sensor assembly 20.

Handle stop 64 extends downward from ball valve mount 62 to stop handle 46 from rotating past the closed position (as shown in FIG. 2B). Handle stop 64 can have any size, shape, or configuration but the disclosed embodiment includes handle stop 64 that extends downwards just enough to engage rotation wing 50 by sliding into the notch in rotation wing 50. Handle stop 64 can be a bolt or other fastener that fastens ball valve mount 62 or other components to container 12. Handle stop 64 is positioned at a location in relation to drain outlet 58 such that rotation wing 50 and ball valve column 30 can only rotate 90 degrees between the open position (where rotation wing 50 is adjacent drain outlet 58) and the closed position (where rotation wing 50 is adjacent handle stop 64). The location and presence of handle stop 64 ensures that drain ball valve 32 aligns within channel 56 when in the closed position to allow oil to flow out of tube 22 and ensures that the plurality of ball valves 32 do not align with the series of holes 24 in tube 22 to seal the oil within container 12 off from the inner cavity of tube 22.

Ball valve column 30 rotates between the open position (shown in FIGS. 2A and 3A) and the closed position (shown in FIGS. 2B and 3B). When in the open position, ball valve column 30 is in a position such that the plurality of ball valves 32 are aligned with the series of holes 24 to allow oil to access oil level sensor 28 within tube 22 by allowing oil to flow into and fill the inner cavity of tube 22 to a level that is the same as a level of oil within container 12. In the open position, oil level sensor 28 measures the level of oil within tube 22 and, because the level of oil within tube 22 is equal to the level of oil in container 12, takes an accurate measurement of the oil within container 12 and, through other components, conveys this measurement to the necessary entity, whether that's a human operator or a computer monitoring oil level sensor assembly 20. With handle 46 (which is attached to and rotates with ball valve column 30) in the open position, arm 52 engages base projection 40 to prevent oil level sensor 28 from being removed from tube 22. Also, drain plug 60 is able to engage drain outlet 58 by being inserted through the hole in rotation wing 50 to prevent handle 46 from being rotated out of the open position and to ensure drain 54 is plugged when handle 46 is in the open position. Further, when ball valve column 30 is in the open position, drain ball valve 34 at the bottom of ball valve column 30 is not aligned within channel 56 of drain 54, preventing oil from flowing through drain 54 from the inner cavity of tube 22 out of the system (as will be described in greater detail with regards to FIGS. 4A, 4B, 5A, and 5B). Drain ball valve 34 is not aligned within channel 56 because channel 56 is oriented 90 degrees (perpendicular) from the orientation of the series of holes 24 such that for drain ball valve 34 to be aligned within channel 56 than the plurality of ball valves 32 are not aligned with the series of holes 24.

Oil level sensor assembly 20 includes multiple mistake-proof features that prevent oil from being drained from container 12 and only allows oil to be drained from tube 22 when tube 22 is sealed off from container 12. One mistake-proof feature is arm 52 engaging base projection 40 to prevent oil level sensor 28 from being removed. Another mistake-proof feature is drain plug 60 engaging drain outlet 58 by being inserted through rotation wing 50 to prevent handle 46 from rotating. A third mistake-proof feature is drain ball valve 34 misaligning with channel 56 when in the open position to block the flow path of oil out of tube 22.

When in the closed position (shown in FIGS. 3B and 4B), ball valve column 30 is in a position such that the plurality of ball valves 32 are not aligned with the series of holes 24 in tube 22, sealing the inner cavity of tube 22 off from container 12 so that when the oil within the inner cavity of tube 22 is drained, the whole container 12 is not also drained. With handle 46 in the closed position, rotation wing 50 is rotated to engage handle stop 64 (and cannot rotate past handle stop 64) to ensure that ball valve column 30 and handle 46 do not rotate past the closed position. With ball valve column 30, including the plurality of ball valves 32 and drain ball valve 34, rotated 90 degrees from the open position into the closed position, drain ball valve 34 becomes aligned with channel 56 of drain 54, creating a complete flow passage for oil to flow out of tube 22 through drain outlet 58. In the closed position, drain outlet 58 is no longer plugged by drain plug 60 because drain plug 60 needs to be removed from drain outlet 58 to move handle 46 into the closed position (because drain plug 60 is inserted through rotation wing 50 to engage drain outlet 58 when in the open position). With arm 52 no longer engaging base projection 40 on base 38 because handle 46 is rotated out of the open position, oil level sensor 28 can be removed from tube 22 and separated from the rest of oil level sensor assembly 20 for inspection and maintenance. Ball valve column 30 can remain in the closed position for an extended period until oil level sensor 28 is returned to tube 22 and oil level sensor assembly 20.

Figure 4A:
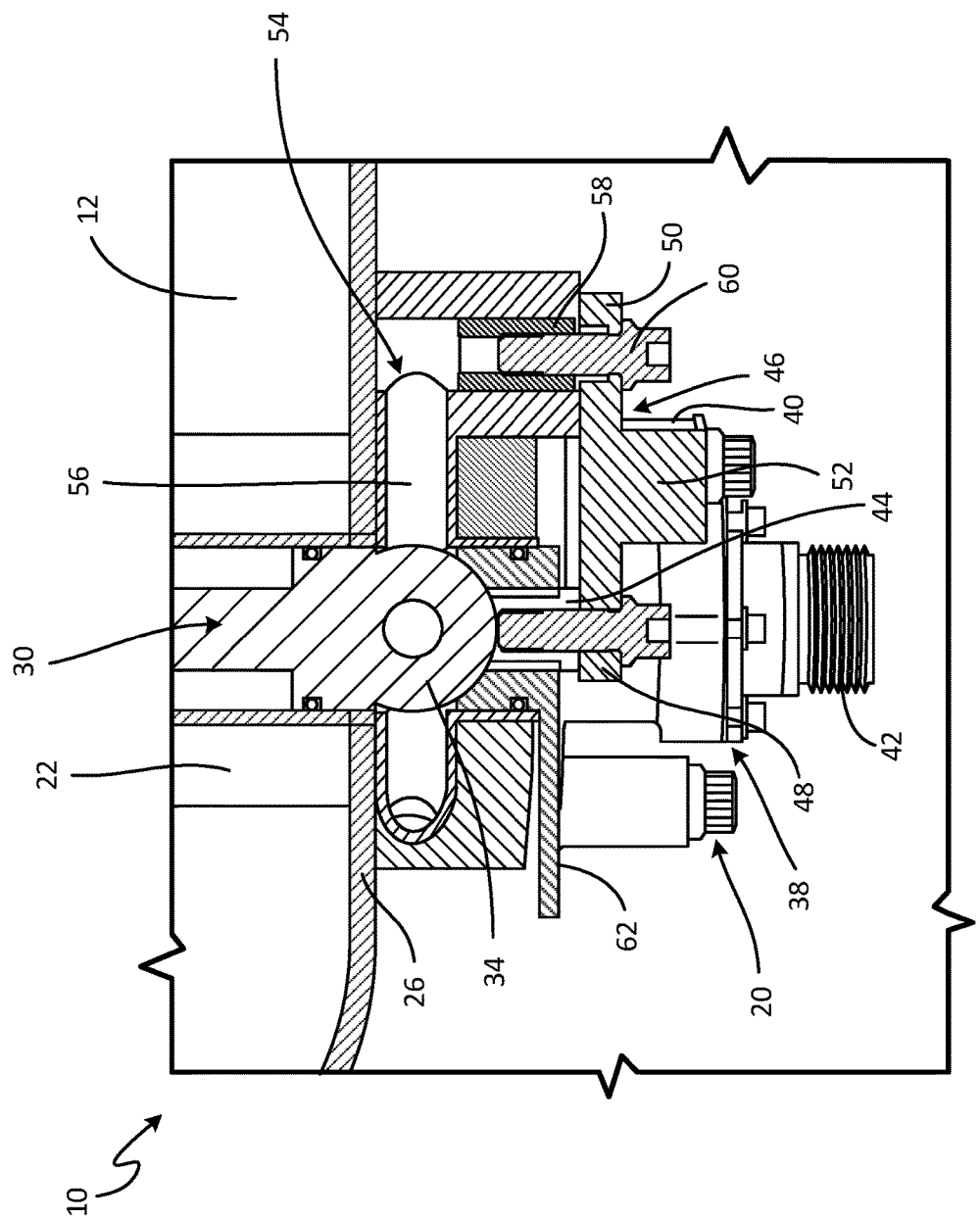
FIG. 4A is a second cross-sectional elevation view of a portion of the inverted oil level sensor assembly in the open position.
Figure 4B:
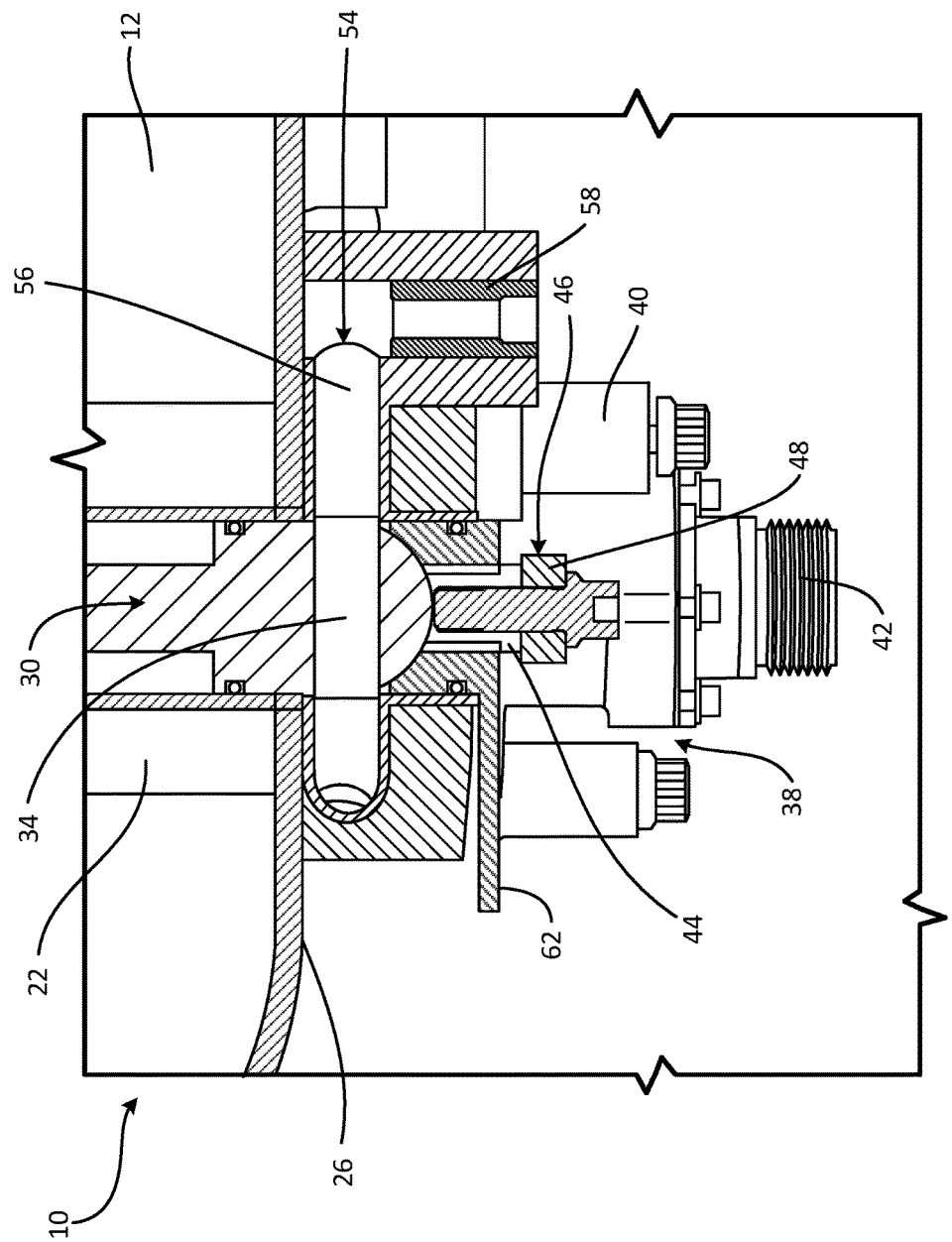
FIG. 4B is the second cross-sectional elevation view of a portion of the inverted oil level sensor assembly in the closed position.

FIG. 4A is a second cross-sectional elevation view of a portion of oil level sensor assembly 20 in the open position, and FIG. 4B is the second cross-sectional elevation view of a portion of oil level sensor assembly 20 in the closed position. The second cross-sectional elevation view in FIGS. 4A and 4B is a view that is perpendicular (rotated 90 degrees) to the first cross-sectional elevation view in FIGS. 3A and 3B. FIG. 5A is a cross-sectional plan view of the inverted oil level sensor assembly in the open position, and FIG. 5B is a cross-sectional plan view of the inverted oil level sensor assembly in the closed position.

Oil tank 10 includes container 12 and oil level sensor 20. Oil level sensor assembly 20 includes tube 22, oil level sensor 28, ball valve column 30, drain 54, and ball valve mount 62. Tube 22 includes the series of holes 24, bottom 26, and wall 36. Oil level sensor 28 includes base 38 with base 38 having base projection 40 and base connector 42. Ball valve column 30 includes the plurality of ball valves 32, drain ball valve 34, ball valve column cap 44, and handle 46 with handle 46 having pivot wing 48, rotation wing 50, and arm 52. Drain 54 includes channel 56, drain outlet 58, and drain plug 60. Valve mount 62 includes handle stop 64 (as shown in FIGS. 2A and 2B).

FIG. 4A is taken along line 4A-4A as shown in FIG. 5A. FIGS. 4A and 5A show ball valve column 30 in the open position such that drain ball valve 34 is not aligned within channel 56 of drain 54. When ball valve column 30 is in the open position, drain ball valve 34 is perpendicular to channel 56 to prevent oil from flowing through drain 54 and out through drain outlet 58. Additionally, drain plug 60 engages drain outlet 58 through rotation wing 50, providing another block to oil draining out through drain outlet 58. As shown in FIG. 5A, drain 54 is substantially L-shaped starting at tube 22 and terminating at drain outlet 58. Channel 56 is the straight passage in which drain ball valve 34 is located between a bend in drain 54 and drain outlet 58. Channel 56 is perpendicular (i.e., rotated 90 degrees) from the series of holes 24 in tube 22. Drain 54 can have a variety of sizes, shapes, configurations, and orientations and should allow oil to drain from the inner cavity of tube 22 out of the system (when in the closed position) without the oil becoming clogged or otherwise inhibited.

FIG. 4B is taken along line 4B-4B as shown in FIG. 5B. FIGS. 4B and 5B show ball valve column 30 in the closed position such that drain ball valve 34 is aligned within channel 56 of drain 54. When ball valve column 30 is in the closed position, drain ball valve is aligned within channel 56 to allow oil to flow through drain 54 and out through drain outlet 58. Because drain 54 is on the bottom side of container 12, gravity is utilized to drain oil from tube 22 when drain 54 is open (when drain ball valve 34 is aligned within channel 56 and drain plug 60 is not plugging drain outlet 58). Additionally, rotation wing 50 engages handle stop 64 to ensure ball valve column 30 is not rotated past the closed position so drain ball valve 34 and channel 56 align. Because of drain plug 60 is partially within drain outlet 58 and within the hole in rotation wing 50 when in the open position, drain plug 60 must be removed before ball valve column 30 and handle 46 are rotated to the closed position. Therefore, drain plug 60 is not plugging drain outlet 58 when ball valve column 30 is in the closed position and oil can easily flow out of tube 22 through drain 54. A hole in drain ball valve 34 that oil flows through can be sized and shaped to match that of channel 56 or can be a different size, shape, or configuration depending on design considerations.

The disclosed inverted oil level sensor assembly 20 has many benefits. Oil level sensor assembly 20 does not require oil tank 10 to be drained before oil level sensor 28 can be removed, saving maintenance time and oil that will be lost in the process. Because oil level sensor 28 is inserted from the bottom of container 12, a minimal air gap needs to be present in container 12, reducing the size and weight of oil tank 10 and container 12. Oil level sensor assembly 20 also has only a few moving parts (the rotation of ball valve column 30 and handle 46 between the open position and the closed position), reducing the complexity and the number of components that can become damaged throughout the life of oil tank 10. The inverted oil level sensor assembly 20 has a number of safeguards that prevent oil level sensor 28 from being removed without first sealing tube 22 off from the oil within container 12, preventing oil in container 12 from draining through drain 54 in tube 22 and the void left by the removal of oil level sensor 28. Oil level sensor assembly 20 can be designed into a new and unused oil tank 10 or can be implemented in an already existing oil tank 10 (i.e., oil tank 10 can be retrofitted to accommodate oil level sensor assembly 20).

Discussion of Possible Embodiments

The following are non-exclusive descriptions of possible embodiments of the present invention.

An oil level sensor assembly for an oil tank includes a cell with a first set of holes along the cell, an oil level sensor within the cell that is configured to be inserted into and removed from a bottom of the cell, and a ball valve column within the cell and adjacent to the oil level sensor. The ball valve column is rotatable, has ball valves that correspond with the first set of holes along the cell, and is configured such that the ball valve column is rotatable to an open position aligning the ball valves with the first set of holes to allow oil to access the oil level sensor and rotatable to a closed position misaligning the ball valves with the first set of holes to prevent oil from accessing the oil level sensor.

The oil level sensor assembly of the preceding paragraph can optionally include, additionally and/or alternatively, any one or more of the following features, configurations, and/or additional components:

A drain port in fluidic connection with the cell and a drain ball valve of the ball valve column, the drain ball valve being within a channel of the drain port that is oriented 90 degrees from the first set of holes such that the ball valve column is rotatable to the closed position aligning the drain ball valve with the channel to allow oil to exit the cell through the drain port.

A drain plug engageable with an outlet of the drain port.

A handle on a bottom end of the ball valve column, wherein the drain plug secures the handle and the ball valve column in the open position.

A handle on a bottom end of the ball valve column.

The handle in the open position engages a base of the oil level sensor to prevent the oil level sensor from being removed from the cell.

The handle has an arm with a slot that engages a projection on the base of the oil level sensor.

A ball valve mount cover adjacent to the handle and the bottom of the ball valve column.

A handle stop on the ball valve mount that is configured to prevent the handle and the ball valve column from rotating past 90 degrees from the open position.

A wall that separates the cell into a first cavity that houses the oil level sensor and a second cavity that houses the ball valve column, the wall having a second set of holes that correspond with the first set of holes and the ball valves of the ball valve column such that the ball valve column is rotatable to the open position aligning ball valves with the first set of holes and the second set of holes to allow oil to enter the first cavity without filling the second cavity.

The first set of holes includes at least one hole adjacent to a top of the cell and at least one hole adjacent to the bottom of the cell.

An oil tank for an engine includes a container, a tube extending from a bottom of the container with the tube having a series of holes along the tube that open into the container and an inner cavity that is accessible through a bottom of the tube, an oil level sensor within the tube that is configured to be inserted into and removed from the tube through the bottom of the tube, and a valve column within the tube and adjacent to the oil level sensor. The valve column has a plurality of valve elements that correspond with the series of holes along the tube and being rotatable between a first position that allows oil to flow through at least one of the series of holes and at least one of the plurality of valve elements to access the oil level sensor and a second position that prevents oil from flowing through the series of holes and the plurality of valve elements.

The oil tank of the preceding paragraph can optionally include, additionally and/or alternatively, any one or more of the following features, configurations, and/or additional components:

A drain at the bottom of the tube and in fluidic connection with the inner cavity with the drain having a channel that is radially offset from the series of holes and a drain valve within the channel and incorporated into and rotatable with a bottom of the valve column such that the drain valve aligns with the channel in the second position to allow oil to flow out of the inner cavity of the tube.

A drain plug engageable with an outlet of the drain.

A handle extending from the bottom of the valve column out through the bottom of the tube and the bottom of the container.

The drain plug secures the handle in the first position.

The handle has an arm with a slot that engages a projection on a base of the oil level sensor.

A handle stop extending from the bottom of the container to prevent the handle and the valve column from rotating past a set angle from the first position.

A tube extends entirely through the container and has a sealed top.

The valve column is one continuous element with the plurality of valve elements such that rotation of the valve column rotates all of the plurality of valve elements in unison.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An oil level sensor assembly for an oil tank, the assembly comprising:
   a cell with a first set of holes along the cell;
   an oil level sensor within the cell, the oil level sensor configured to be inserted into and removed from a bottom of the cell; and
   a ball valve column within the cell and adjacent to the oil level sensor, the ball valve column being rotatable, having ball valves that correspond with the first set of holes along the cell, and configured such that the ball valve column is rotatable to an open position aligning the ball valves with the first set of holes to allow oil to access the oil level sensor and rotatable to a closed position misaligning the ball valves with the first set of holes to prevent oil from accessing the oil level sensor.

2. The assembly of claim 1, further comprising:
   a drain port in fluidic connection with the cell and a drain ball valve of the ball valve column, the drain ball valve being within a channel of the drain port that is oriented 90 degrees from the first set of holes such that the ball valve column is rotatable to the closed position aligning the drain ball valve with the channel to allow oil to exit the cell through the drain port.

3. The assembly of claim 2, further comprising:
   a drain plug engageable with an outlet of the drain port.

4. The assembly of claim 3, further comprising:
   a handle on a bottom end of the ball valve column, wherein the drain plug secures the handle and the ball valve column in the open position.

5. The assembly of claim 1, further comprising:
   a handle on a bottom end of the ball valve column.

6. The assembly of claim 5, wherein the handle in the open position engages a base of the oil level sensor to prevent the oil level sensor from being removed from the cell.

7. The assembly of claim 6, wherein the handle has an arm with a slot that engages a projection on the base of the oil level sensor.

8. The assembly of claim 5, further comprising:
   a ball valve mount cover adjacent to the handle and the bottom of the ball valve column.

9. The assembly of claim 8, further comprising:
   a handle stop on the ball valve mount that is configured to prevent the handle and the ball valve column from rotating past 90 degrees from the open position.

10. The assembly of claim 1, further comprising:
    a wall that separates the cell into a first cavity that houses the oil level sensor and a second cavity that houses the ball valve column, the wall having a second set of holes that correspond with the first set of holes and the ball valves of the ball valve column such that the ball valve column is rotatable to the open position aligning ball valves with the first set of holes and the second set of holes to allow oil to enter the first cavity without filling the second cavity.

11. The assembly of claim 1, wherein the first set of holes includes at least one hole adjacent to a top of the cell and at least one hole adjacent to the bottom of the cell.

12. An oil tank for an engine comprising:
    a container;
    a tube extending from a bottom of the container, the tube having a series of holes along the tube that open into the container and an inner cavity that is accessible through a bottom of the tube;
    an oil level sensor within the tube that is configured to be inserted into and removed from the tube through the bottom of the tube; and
    a valve column within the tube and adjacent to the oil level sensor, the valve column having a plurality of valve elements that correspond with the series of holes along the tube and being rotatable between a first position that allows oil to flow through at least one of the series of holes and at least one of the plurality of valve elements to access the oil level sensor and a second position that prevents oil from flowing through the series of holes and the plurality of valve elements.

13. The oil tank of claim 12, further comprising:
    a drain at the bottom of the tube and in fluidic connection with the inner cavity, the drain having a channel that is radially offset from the series of holes; and
    a drain valve within the channel and incorporated into and rotatable with a bottom of the valve column such that the drain valve aligns with the channel in the second position to allow oil to flow out of the inner cavity of the tube.

14. The oil tank of claim 13, further comprising:
    a drain plug engageable with an outlet of the drain.

15. The oil tank of claim 14, further comprising:
    a handle extending from the bottom of the valve column out through the bottom of the tube and the bottom of the container.

16. The oil tank of claim 15, wherein the drain plug secures the handle in the first position.

17. The oil tank of claim 15, wherein the handle has an arm with a slot that engages a projection on a base of the oil level sensor.

18. The oil tank of claim 15, further comprising:
    a handle stop extending from the bottom of the container to prevent the handle and the valve column from rotating past a set angle from the first position.

19. The oil tank of claim 12, wherein the tube extends entirely through the container and has a sealed top.

20. The oil tank of claim 12, wherein the valve column is one continuous element with the plurality of valve elements such that rotation of the valve column rotates all of the plurality of valve elements in unison.

* * * * *